UNITED STATES PATENT OFFICE.

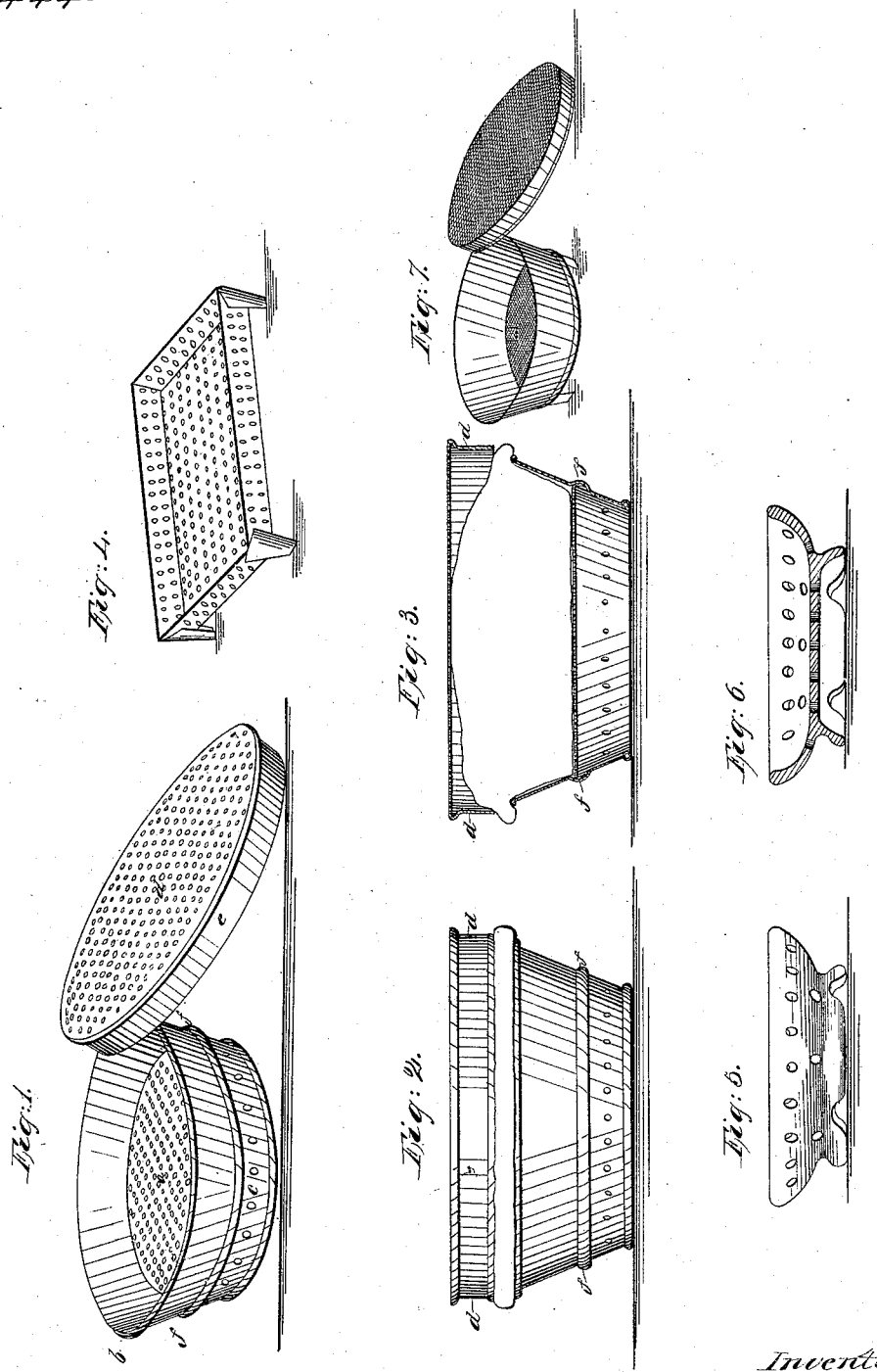

B. F. MILLER, OF NEW YORK, N. Y.

IMPROVED BAKE-PAN.

Specification forming part of Letters Patent No. 33,444, dated October 8, 1861.

*To all whom it may concern:*

Be it known that I, B. F. MILLER, of the city, county, and State of New York, have invented a new and useful Pan or Dish for Baking in; and I do hereby declare that the following is a full and exact description thereof, reference being had to the accompanying drawings and the letters of reference marked thereon.

The nature of my invention is to provide a more equable and uniform degree of heat to the exterior portions or surfaces of the material to be baked and at the same time afford a freer circulation of air and thus facilitate evaporation.

To enable others skilled in the art to make and use my invention, I will proceed to describe its construction and operation.

Figure I represents the "bake-pan" and the lid or cover, which is made so as to fit loosely on the pan; $b$, the upper portion of the side of the "pan," and $c$ the lower portion or bottom, which is perforated, as shown in the drawings, by a sufficient number of holes or perforations. $a$ is a perforated metallic plate with smaller and more numerous perforations, dividing the pan into an upper and lower portion, by which means the perforated plate $a$ is kept at a fixed permanent or required distance from the floor or bottom of the oven. $d$ is another similarly-perforated plate held in its position on the top of the said pan by the rim $e$, which, as before observed, fits loosely on the top of the pan.

Fig. II is an elevation of the whole bake-pan with its cover in the position elevated or raised by the rising or expansion of the material during the said baking process.

Fig. III is a section of the said pan with its cover in position and showing the mode in which the loosely-fitting cover enables the material to expand or rise during the process of baking. At letters $ff$, Fig. III, is shown one of the modes in which the perforated plate is fastened or fixed in its proper position.

Fig. IV represents a metallic bake pan or dish, with the sides as well as the bottom perforated.

Fig. V represents an earthenware bake pan or dish; and Fig. VI represents a section of the same, showing the bottom as well as the side with similar perforations.

Fig. VII represents a metallic bake pan or dish and its cover or lid, with a wire-gauze or "sieve-like" bottom and cover instead of the perforated metallic plate.

What I claim as my invention, and desire to secure by Letters Patent, is—

1. The application of perforated metallic plates or wire-gauze and earthenware structures, as hereinbefore described, for the purpose of constituting the bottom, and when desirable the sides of the baking pan or dish, and the same kept from contact with the bottom or floor of the oven.

2. In combination with the aforesaid structures, a perforated metallic or sieve-like cover or lid, as hereinbefore set forth and described.

B. F. MILLER.

Witnesses:
H. MORTON,
WALTER L. SINGSTON.